(12) United States Patent
Liddy et al.

(10) Patent No.: US 7,412,632 B2
(45) Date of Patent: Aug. 12, 2008

(54) METHOD TO FACILITATE FAILURE MODES AND EFFECTS ANALYSIS

(75) Inventors: Richard Liddy, Westland, MI (US); Bruce Maeroff, Ann Arbor, MI (US); David Craig, Taylor, MI (US); Toni Brockers, Duesseldorf (DE); Uwe Oettershagen, Gummersbach (DE); Tim Davis, Warwick (GB)

(73) Assignee: Ford Motor Company, Dearborn, MI (US)

( * ) Notice: Subject to any disclaimer, the term of this patent is extended or adjusted under 35 U.S.C. 154(b) by 411 days.

(21) Appl. No.: 10/707,186

(22) Filed: Nov. 25, 2003

(65) Prior Publication Data

US 2005/0138477 A1    Jun. 23, 2005

(51) Int. Cl.
*G06F 11/00* (2006.01)
(52) U.S. Cl. .......................................... 714/57
(58) Field of Classification Search .................... 714/57
See application file for complete search history.

(56) References Cited

U.S. PATENT DOCUMENTS

| | | | |
|---|---|---|---|
| 5,586,252 | A | 12/1996 | Barnard et al. |
| 5,628,007 | A | 5/1997 | Nevarez |
| 5,913,204 | A | 6/1999 | Kelly |
| 6,065,133 | A | 5/2000 | Draber |
| 6,240,400 | B1 | 5/2001 | Chou et al. |
| 6,453,209 | B1 | 9/2002 | Hill et al. |
| 7,017,080 | B1 * | 3/2006 | Liggesmeyer et al. ......... 714/26 |
| 2002/0120490 | A1 | 8/2002 | Gajewski et al. |
| 2003/0028830 | A1 | 2/2003 | Kallela et al. |
| 2003/0033093 | A1 | 2/2003 | Nelson |
| 2003/0055695 | A1 * | 3/2003 | Mori et al. ..................... 705/7 |
| 2004/0128108 | A1 * | 7/2004 | Cutuli et al. ................. 702/185 |
| 2004/0256718 | A1 * | 12/2004 | Chandler et al. ............ 257/704 |

OTHER PUBLICATIONS

SuperFMEA Powerpoint presentation, http://www.superfmea.com.*
Kimura et al., "Reliability-Centered Maintenance Planning based on Computer-Aided FMEA", The 35th CIRP-International Seminar on Manufacturing Systems, May 12-15, 2002, Seoul, Korea.*
User's Manual for Sabaton v1.0, Sydvest, Oct. 4, 2002.*
Kmenta et al., "Advanced Failure Modes and Effects Analysis of Complex Processes", Proceedings of the 1999 ASME Design Engineering Technical Conferences Sep. 12-15, 1999, Las Vegas, Nevada. □□.*
Hecht et al., "Computer-Aided Software FMEA", SoHaR Incorporated, Culver City, CA.*
BYTEWORX, computer program, publication date is unknown, published at www.byteworx.com.

* cited by examiner

*Primary Examiner*—Michael C Maskulinski
(74) *Attorney, Agent, or Firm*—Gary A. Smith; Brooks Kushman P.C.

(57) ABSTRACT

A method and system to facilitate failure modes and effects analysis (FMEA) of one or more components of a system. The FMEA is indicated with the generation of an FMEA form. A graphical user interface provides a sequential order of completion for a number of steps. The steps are followed to generate graphical representations which are to be completed by an FMEA analyst and received by the graphical user interface to facilitate generating the FMEA form.

16 Claims, 10 Drawing Sheets

| Item 28 | Function | Potential Failure Mode 30 | Potential Effect(s) of Failure 32 | Sev 34 | Class 36 | Potential Cause(s)/ Mechanism(s) of Failure 38 | Occur 40 | Current Design Controls Prevention 42 | Current Design Controls Detection 44 | Detec 46 | R.P.N. 48 | Recommended Action(s) 50 | Responsibility & Target Completion Date 52 | Action Results 26 / 54 | | | | |
|---|---|---|---|---|---|---|---|---|---|---|---|---|---|---|---|---|---|---|
| | | | | | | | | | | | | | | Actions Taken | Sev 56 | Occ 58 | Det 60 | R.P.N. 62 |

FIG.2

130 — 118  ☐ 3  PREPARE PARAMETER DIAGRAM
Attach a file containing the Parameter Diagram for this FMEA. Input comments below.

Click to attach the file here

154 — 118  ☐ 4  GENERATE FMEA FORM
Attach file containing the FMEA Form. Input comments below.

Click to attach file here

162 — 118  ☐ 5  REVISE FMEA FORM
Attach file containing the revised FMEA Form. Input comments below.

Click to attach file here

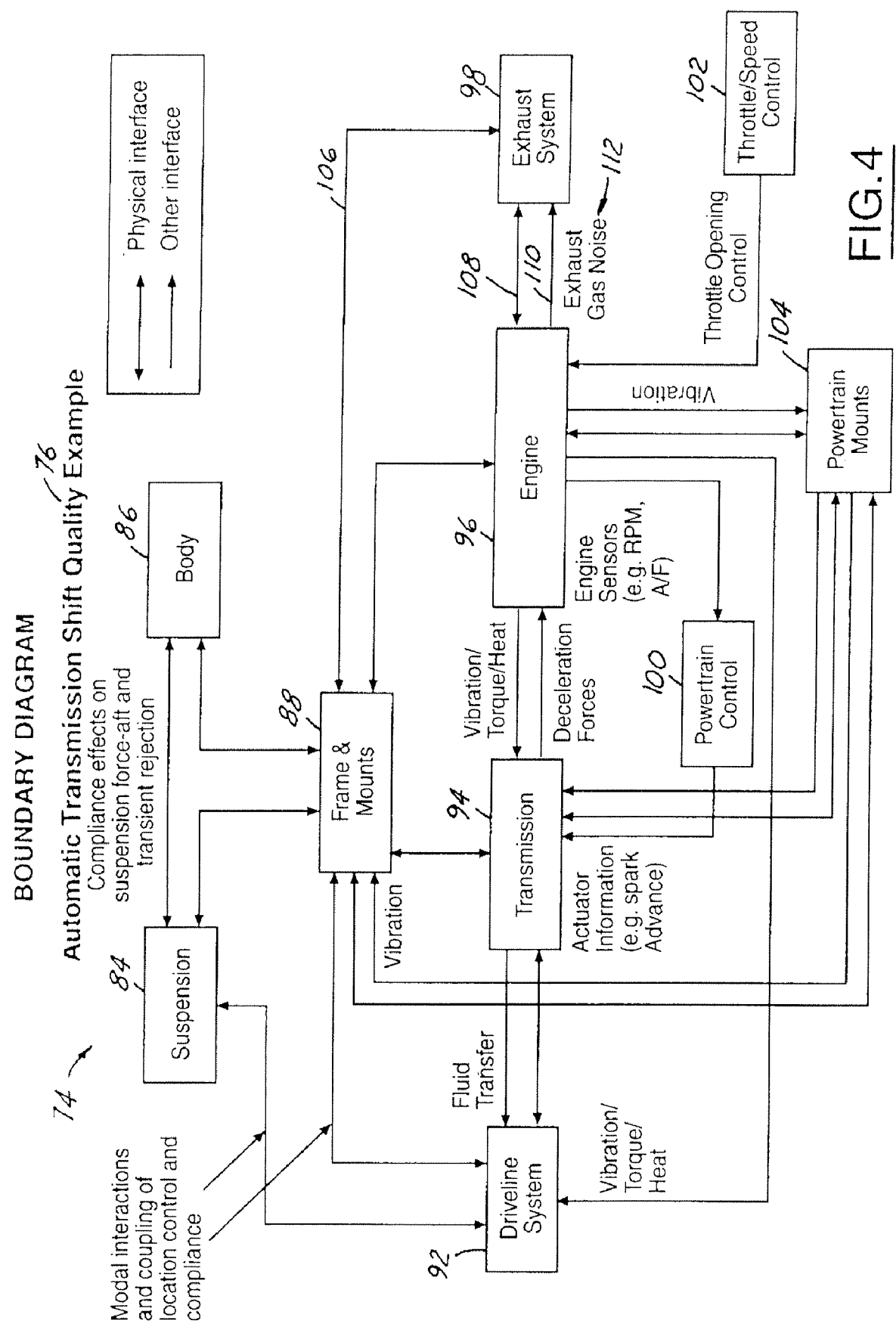

Split Matrix

| | Body: | Engine: | Transmission: | Exhaust System: | Suspension System: | Frame & Mounts: | Driveline System: | Steering System: | P/T Control: | Accelerator Controls: | Powertrain Mounting: |
|---|---|---|---|---|---|---|---|---|---|---|---|
| Body: | | | | | | 2 | | | | 2 | |
| Engine: | -1 | | | 2 | 2 | 2 | | 2 | | 2 | 1 | 2 | 2 |
| | | | 2 | | 2 | | 1 | | 2 | 2 | | |
| Transmission: | -1 | | | | | 2 | 2 | | 2 | 2 | | 2 | 2 |
| | | | | | | | | 2 | 2 | | | |
| Exhast System: | -1 | -1 | -1 | -1 | | 2 | | | | | |
| Suspension System: | -1 | | | -1 | -1 | 2 | | | | | 1 |
| Frame & Mounts: | -1 | -1 | -1 | -1 | -1 | | 2 | | | 2 | 2 |
| Driveline System: | -1 | | -1 | -1 | -1 | -1 | | | | | |
| Steering System: | -1 | -1 | | | | -1 | -1 | | | | |
| P/T Control: | | | | | | | -1 | | | 2 | |
| Accelerator Controls: | | -1 | | | | | | | | | |
| Powertrain Mounting: | -1 | | | | | | -1 | -1 | | | |

```
P E    P: Physically touching     E: Energy transfer
I M    I: Information exchange    M: Material exchange
```

Required     2  Necessary for function
Desired      1  Beneficial, but not absolutely necessary for functionality
Indifferent  0  Does not affect functionality
Undesired   -1  Causes negative effects but does not prevent functionality
Detrimental -2  Must be prevented to achieve functionality

FIG.5

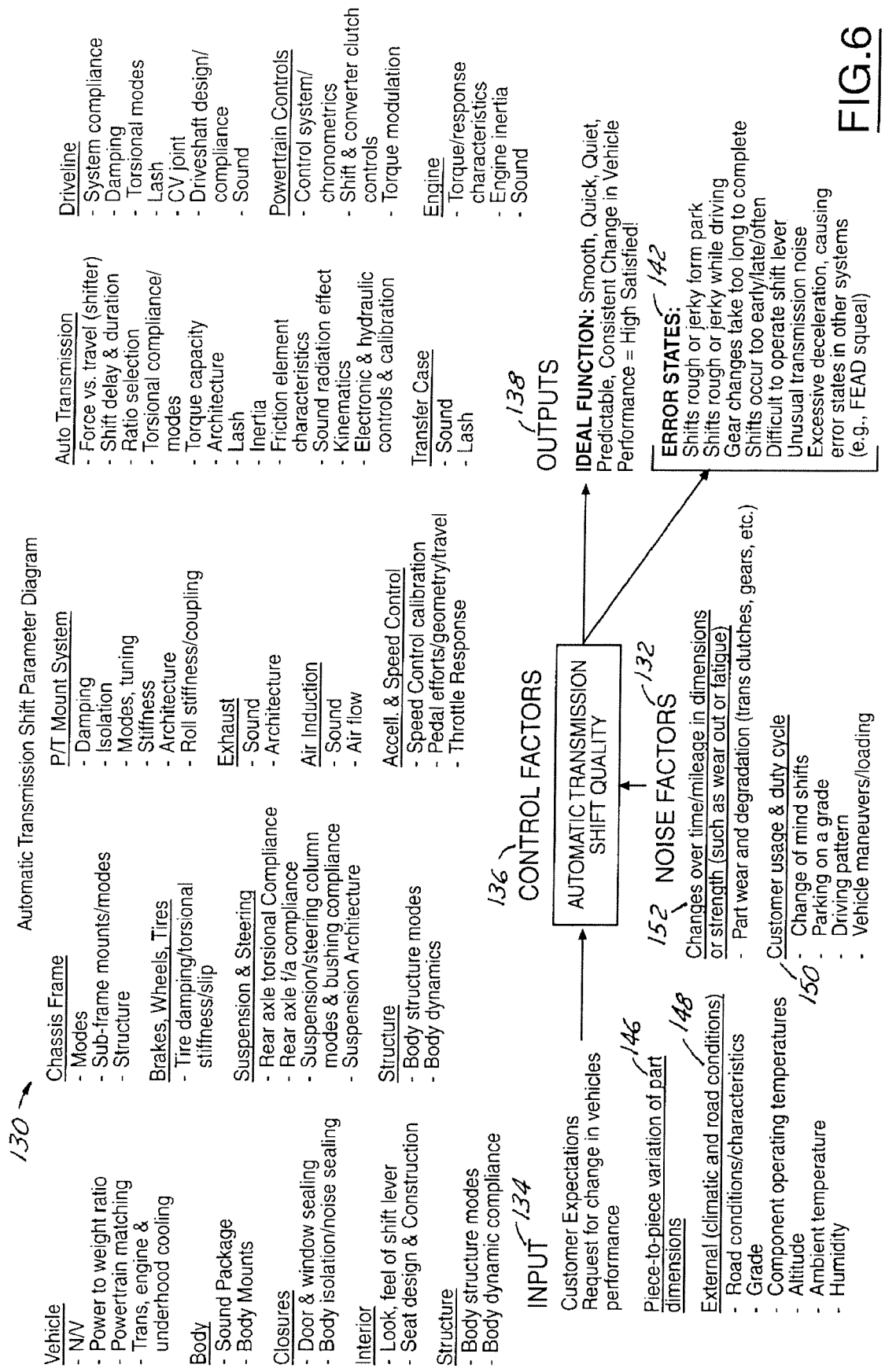

156

| Item/Function | Potential Failure Mode | Potential Effect(s) of Failure | Sev | Class | Potential Cause(s)/ Mechanism(s) of Failure | Occur | Current Controls Prevention |
|---|---|---|---|---|---|---|---|
| Function: Needs, Wants, Requirements<br><br>Must be verb-noun measurable or constraints<br>Methods: Brainstorm<br><br>Input Include: Function tree, Previous/ similar FMEAs, SDS, Boundary Diagram, QFD | 4 Thought Starters:<br>No function<br>Partial /over function/degraded over time<br>Intermittent Function<br>Unintended function<br><br>Methods:<br>Brainstorm using 4 Thought Starters<br>List each in separate field<br><br>Input include:<br>P-diagram, Interface matrix, Similar FMEAs, 8D's, Warranty, TGW | Including:<br>Government/safety<br>Ultimate Customer, Vehicle, Other systems, Subsystems, Components, Item, Manufacturing/ assembly/service<br><br>Methods:<br>Brainstorm, Rate each; put highest in next column<br><br>Inputs include:<br>P-diagram, Interface Matrix, Warranty, 8Ds, TGW Previous similar FMEAs<br><br>For classification: See FAP03-111 or Section 6 of this Handbook. As of this date = YC or YS or blank. | | | For cause: Why has this happened or how might this happen?<br><br>Use 2 assumptions:<br>1) Item will be manufactured/ assembled to specification<br>2) Design includes a deficiency that may cause unacceptable variation<br><br>Methods:<br>1) Brainstorm<br>2) Rate each occurrence-put in next column<br><br>Inputs include:<br>Warranty, 8D, TGW, Previous/similar FMEAs, P-diagram, Interface matrix, test data | | Controls are already planned, or are normal and customary for this type item<br><br>Remember that Prevention Controls have and affect on the Occurrence<br><br>Inputs include: Warranty, 8D, TGW, Previous/ similar FMEAs, Test data, Previous DV plan, P-diagram |
| Catalytic Converter must suppress the generation of Sulfur odor (H2S) that can be detected by the customer (rotten egg smell) (ppm/test H2S) for target life of vehicle. (10yr/150K Ml) (PZEV, 15yr/ 150K Ml) | Excessive release of H2S | Customer dissatisfaction (Unpleasant Odor) (Rotten Egg Smell) | 7 | YS | Improper Calibration:<br>1) Rich A/F excursions - during transients - at idle - Canister purge at idle and during low speed cruises<br>2) Lean A/F exclusions - during transients - during decels with coordinated with fore-aft oxygen control<br>3) Catalyst Temperature Model false triggering of enrichment<br>4) Closed loop fuel control - peak-to-peak amplitude (>0.03 lambda)<br>5) Tailpipe O2 - minor amount (<0.03%) not present to ensure that SO2 can be liberated from NiO added to catalyst (during cruises and decels) | 5 | 1. Review Calibration Guides for H2S prevention.<br>2. Review related G8D: #24094 U152 Sulfer Odor.<br>3. Search Technical Service Bulletin (TSB) database for H2S, Sulfer, Smell, Rotten Egg Smell.<br>4. Campaign Prevention Reviews.<br>5. Calibration Technical Reviews. |

FIG.7A

| Current Design Controls Detection | Detec | R.P.N. | Recommended Action(s) | Responsibility & Target Completion Date | Action Results - Actions Taken | Sev | Occ | Det | R.P.N. |
|---|---|---|---|---|---|---|---|---|---|
| Current Controls are 2 types: 1) Prevent a cause/mechanism of failure 2) Detect the failure mode or detect the cause/mechanism of failure<br><br>Methods: 1) Rate each detective control 2) Put best (lowest) or composite in the Detection column. 10 if no detection. | | | List the action. If no action planned, enter "None" or "None at this time".<br><br>Must have a recommended action for any special Characteristic item. | Enter who (not just the department), will complete and when. 11/5/2003 | Enter a breif description of the action after it hs been completed.<br><br>Enter the revised Severity, Occurrence, and detection number to the right to reflect the results of the action.<br><br>Recalculate | | | | |
| | | | It is possible to have multiple actions against a cause or failure mode. | There should be a name here, XYZ department. 5/10/2003 | | | | | |
| VEHCLE ARL Emissions Attribute requirement 02-0260 for Calibration 10-pager (23-0002) H2S Emissions test (6) Associated DVM: DVM 0030-23 DVM 0031-23 DVM 0037-23 DVM 0007-23 DVM 0001-23 DVM 0011-23 DVM 0017-23 Vehicle tests: Objective H2S Test Ns31 Subjective H2S Test CETP 00.00-R-221 | 6 | 210 | 1) Reduce APTL Mass Spec testing variability. 2) Develop ppm/test acceptance criteria that correlated to customer field concerns. | J. Sloss, M. Dennis, J. Scaparo, M. Lieborwitz 1 May 2003 | Release updated APTL Standard H2S Test For Sign-Off (NS33) CETP 00.00-L-931<br><br>Deleted subjective test CETP 00.00-R221 | 7 | 3 | 2 | 42 |
| | | | (Update, released & published Corporate Quality Documents (DFMEA, Calibration Guides, CETP) | 1) Reduce APTL Mass Spec testing variability 2) Develop ppm/test acceptance criteria that correlated to customer field concerns. | Released and published Corporate Quality Documents to EKB. | | | | |

Ideal Function
Provide a pleasing environment (operating efforts, min. reasonant frequency 36 Hz, solid operation sound, craftmanship, ergonomics)
House/Accodate components ans sub-systems.

ERROR STATES
G| Excessive deceleration, causing error states in other system (e.g., FEAD squeal)
F| Unusual transmission noise
E| Difficult to operate shift lever
D| Shift occur too early/late/often
C| Gear changes take too long to complete
B| Shift rough or jerky while driving
A| Shift rough or jerky from park

NOISE FACTOR 1: TOTAL DESIGN/MANUFACTURING VARIABILITY
a) raw material variation
b) excessive process parameter variation
c) surface finish/texture variation
d) gloss variation
e) color variation
f) incompatibility of tolerance capability
g) 3 dimensional location of substrate to skin
h) inside/outside profile variation (skin openings)
i) attachment clamp load variation

Control Factors

| | Ref | Test included in DVP/FDVS? Y or N | Test description | Test No / Standard |
|---|---|---|---|---|
| 1 | | Y | KEY LIFE TEST | DVM-0001-IP |
| 2 | | Y | S&R DURABILITY | DVM-0002-IP |
| 3 | | Y | GUIDLINES - PACKAGING | DVM-0003-IP |
| 4 | | Y | GLOVE COMPARTMENT CYCLE LIFE | DVM-0008-IP |
| 5 | | Y | STIFFNESS OF FINISHED PANELS | DVM-0009-IP |
| 6 | | Y | ENVIRONMENTAL IMPACT | DVM-0011-IP |
| 7 | | Y | SERVICE ASSEMBLY FEASIBILITY | DVM-0012-IP |
| 8 | | Y | ASSEMBLY STANDARD TORQUE | DVM-0023-IP |
| 9 | | Y | MATERIALS PERFORMANCE | VARIOUS |
| 10 | | Y | SUNLOAD | DVM-0024-MA |
| 11 | | Y | PACKAGING GUIDELINES | DVM-0063-IP |
| 12 | | Y | COLOUR, GRAIN & GLOSS REVIEW | REV-IP-005 |
| 13 | | Y | RSS TOLERANCE STUDY | REV-IP-010 |
| 14 | | N | VEHICLE DURABILITY | CETP00D0R308 |
| 15 | | N | 4POSTER DURA | |
| 16 | | Y | DIMENSIONAL STABILITY | DVM-00023-MA |

NOISE FACTOR MANAGEMENT

| Cat | Strategy |
|---|---|
| I | Change Technology |
| II | Apply Parameter Design |
| III | Upgrade Design Spec. |
| IV | Reduce/Remove Noise |
| V | Add Compensation device |
| VI | Disguise/Divert |

| | A | B | C | D | E | F | G | Strategy used: | Specific applied(describe) | IF3 | IF2 | IF |
|---|---|---|---|---|---|---|---|---|---|---|---|---|
| a | X | X | X | X | X | X | X | III | Mat. Spec. Check | 2 | 1 | |
| b | X | X | X | X | X | X | X | III | Process Charact. | 2 | 1 | |
| c | X | X | X | X | | | | III | Process Charact. | | | |
| d | X | X | | | | | | III | Process Charact. | | | |
| e | X | X | | | | | | III | Process Charact. | | | |
| f | X | X | X | X | X | | | III | Process Charact. | 2 | 1 | |
| g | X | X | X | | | | | III | Usage of Guage | 2 | 1 | |
| h | X | X | | | | | | III | Process Charact. | 2 | 1 | |
| i | X | X | | | | | | III | Process Charact. | 2 | 1 | |

| Ref |
|---|
| C,F,H,J |
| B,C,H,J |
| B,C,H,J |
| B |
| AB |
| AB |
| C |

| NOISE FACTOR 2: COMPONENT CHANGES OVER TIME/MILEAGE - Over Useful Life Period | | | | | | | |
|---|---|---|---|---|---|---|---|
| Change in dimension or change in strength over Useful Life Period (assumptions above) | a) | glovebox hinge dimensions (wear) | X X X | | III | Process Charact. | 2 | C F |
| | b) | wear between mating parts | X X | X | III | Process Charact. | 1 | C C |
| | c) | change in rigidity characteristics of CCB | | X | III | Process Charact. | 1 | C C |
| | d) | part shrinkage/distortion | X | | III | Mat. Spec. Check | 2 | C C F |
| | e) | embrittlement of plastic components | X | X | III | Mat. Spec. Check | 2 | C D |
| | f) | torque loss at fixings over time | X X | | III | Process Charact. | 1 | C D D |
| Other material or chemistry variation | h) | glovebox bump stops hardened | X X | | III | Mat. Spec. Check | 1 | C C |
| | j) | PVC leaching (plasticizer) | X X | | III | Process Charact. | 2 | C E |
| | k) | plastic creep under load | X X | | III | Process Charact. | 1 | C C |
| "Break-in" and/or in-use hysteresis | | | | | | | | |

| NOISE FACTOR 3: DUTY CYCLE / CUSTOMER USAGE - Over Useful Life Period | | | | | | | |
|---|---|---|---|---|---|---|---|
| "Typical" Customer Usge over Useful Life Period (assumptions above) | a) | disassembly for service | X X | X | V | Service Manual | 2 | C |
| | b) | road conditions | X X | X | | TBE | 1 | C C C |
| | k) | component servicing | | X | V | Service Manual | 2 | C |
| Transport, storage, dewaxing | | | X | | | | | |
| Customer misuse/ abuse | c) | spillage of liquids & food stuffs | X X | | | TBE | 1 | |
| | d) | I/P Scratching | | X X | | TBE | 1 | C C F |
| | e) | overloading glovebox | X | | | TBE | 1 | A |
| | f) | leaning on I/P | X | | | TBE | 1 | D |
| | g) | feet on instrument panel | X | | | TBE | 1 | |

FIG.8B

METHOD TO FACILITATE FAILURE MODES AND EFFECTS ANALYSIS

BACKGROUND OF INVENTION

1. Field of the Invention

The present invention relates to failure modes and effects analysis (FMEA). In particular, the present inventions relates to generating a FMEA form to indicate the FMEA.

2. Background Art

Failure Modes and Effects Analysis (FMEA) relates, in general, to a process used to determine the adequacy of current control process and the need to mitigate risks by making changes to the current control process. FMEA relates to any number of industries and applications. Each industry and application may have separate standards and criterion for the control processes used therein.

In the automotive industry, SAE specification J1739 details a number of standards and criterion for automotive related FMEAS. J1739 defines FMEA as a systemized group of activities intended to: (a) recognize and evaluate the potential failure of a product/process and its effects; (b) identify actions which could eliminate or reduce the chance of the potential failure occurring; and (c) document the process. It is complementary to the process of defining what a design or process must do to satisfy the customer.

Generating a FMEA form to indicate the FMEA, whether the FMEA is conducted with respect to the J1739 specification or another specification, tends to be a difficult process in that most FMEA specifications fail to provide a robust method for generating the FMEA form.

SUMMARY OF INVENTION

The present invention overcomes the above-identified deficiencies with a robust method for generating a failure modes and effects analysis (FMEA) form. The method comprises providing a graphical user interface to display a sequential order for creating a number of graphical representations. The graphical representations are created to pictorially diagram component interactions of components comprising the analyzed system. The sequential order insures the graphical representation are created according to a predefined sequence of steps. The FMEA form is then generated after completing the steps.

In the automotive industry, a FMEA form typically comprises a number of data entry fields. The entry fields are filled in by the FMEA analyst to indicate the results of the FMEA. In this manner, the FMEA form indicates the FMEA. The FMEA form of SAE specification J1739 includes an item/function textual entry, a potential failure mode textual entry, a potential effects of failure textual entry, a severity numerical entry, a classification textual entry, a potential cause of failure textual entry, a frequency of occurrence numerical entry, a current designs controls prevention textual entry, a current design controls detection textual entry, a detection numerical entry, a risk prioritization numerical entry, a recommended action textual entry, a responsibility textual entry, an actions taken textual entry, a revised severity numerical entry, a revised frequency of occurrence numerical entry, a revised detection numerical entry, and a revised risk prioritization numerical entry. The present invention assists the FMEA analyst in analyzing the system for the purpose of inputting the data.

One aspect of the present invention relates to utilizing graphical representations of component interactions to facilitate generating the FMEA form. The component interactions relate to the interactions between components comprising a system that the FMEA covers. The graphical representations of the component interactions provide a pictorial diagram of component interactions for one or more components comprising the system. The graphical representations provide the FMEA analyst with a robust visual means to determine potential failure modes within the system.

One aspect of the present invention relates to a sequential order for providing the graphical representations of the component interactions. The sequential order comprises steps for completing a number of graphical representations which the FMEA analyst can use to facilitate generating the FMEA form. The sequential order of the steps can comprise, in order, providing a boundary diagram graphical representation, providing an interface matrix diagram graphical representation, and providing a parameter diagram graphical representation. The sequential order is robust in that each graphical representation builds upon a previous graphical representation to facilitate generating the FMEA form.

One aspect of the present invention relates to a computer-readable medium. The computer-readable medium is programmed to facilitate generating the FMEA form. The computer-readable medium displays a sequential order for creating a number of graphical representations of component interactions by completing in order a number of steps. Once completed, the computer-readable medium is programmed to receive the graphical representations to facilitate generating the FMEA form. The computer-readable medium is preferably programmed to indicate whether the graphical representations are received according to the sequential order of completion. The indications provide robustness in that the FMEA analyst can follow the indications when creating the graphical representations.

BRIEF DESCRIPTION OF DRAWINGS

FIG. 2 illustrates an exemplary failure modes and effects analysis form;

FIG. 4 illustrates a boundary diagram to facilitate the failure modes and effects analysis;

FIG. 5 illustrate an interface matrix diagram to facilitate the failure modes and effects analysis;

FIG. 6 illustrates a parameter diagram to facilitate the failure modes and effects analysis;

FIGS. 7A and 7B illustrate a completed failure modes and effects analysis form; and FIGS. 8A and 8B illustrate an interface checklist diagram to facilitate the failure modes and effects analysis.

DETAILED DESCRIPTION

Figures 1, 3A:
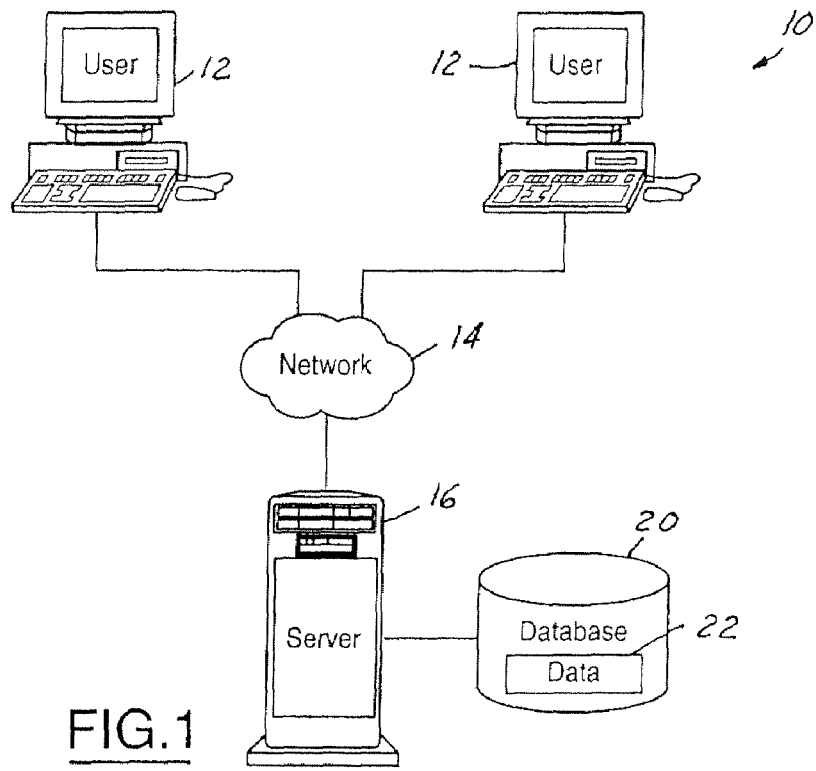
FIG. 1 illustrates a system for failure modes and effects analysis.
FIGS. 3A and 3B illustrate a graphical user interface to facilitate the failure modes and effects analysis.

FIG. 1 illustrates a system 10 for failure modes and effects analysis (FMEA). The system 10 comprises one or more user computers 12 connecting through a network 14 to a network server computer 16. The network computer 16 connects to a database 20 for storing and retrieving data 22. The data 22 stored and retrieved by the network computer 20 can include electronically accessible documents and diagrams.

The network computer 20 includes a processor (not shown) for executing computer-readable instructions. The network computer 20 can execute instructions from a computer-readable medium, such as a hard-drive or compact disk.

FIG. 2 illustrates an exemplary FMEA form 26. The FMEA form 26 shown in FIG. 2 relates to a Society of Automotive Engineers (SAE) specification J1739. As such, this description relates to the automotive industry and conducting FMEAs according to J1739. The scope of the present invention, however, is not limited to the automotive industry or SAE specification J1739. In contrast, the present invention relates to any number of industries which conduct FMEAs.

In the automotive industry, the FMEA form 26 typically comprises a number of data entry fields. The entry fields are filled in by the FMEA analyst to indicate the results of the FMEA. In this manner, the FMEA form 26 indicates the FMEA.

The FMEA form dictated by SAE specification J1739 include an item/function textual entry 28, a potential failure mode textual entry 30, a potential effects of failure textual entry 32, a severity numerical entry 34, a classification textual entry 36, a potential cause of failure textual entry 38, a frequency of occurrence numerical entry 40, a current designs controls prevention textual entry 42, a current design controls detection textual entry 44, a detection numerical entry 46, a risk prioritization numerical (RPN) entry 48, a recommended action textual entry 50, a responsibility textual entry 52, an actions taken textual entry 54, a revised severity numerical entry 56, a revised frequency of occurrence numerical entry 58, a revised detection numerical entry 60, and a revised risk prioritization numerical entry 62. The FMEA analyst inputs data for each entry to generate the FMEA form.

Figure 3B:
Figure 3B:
Figure 3B:
Figure 3B:

FIGS. 3A and 3B illustrate a graphical user interface 66 provided by the network computer 20. The graphical user interface 66 facilitates generating the FMEA form 26 by providing instructions and receiving inputs. In this manner, the FMEA analyst can view the graphical user interface 66 to receive instructions for conducting the FMEA and for inputting data to the graphical interface 66 for use in generating the FMEA.

The graphical user interface 66 can be a web page, or other medium. In particular, the graphical user interface 66 can reside in a computer-readable program which can be loaded on one of the user computers 12 instead of being accessed by the user computers through the network computer 20.

The graphical user interface 66 displays a sequential order (1-5) for creating a number of graphical representations. The graphical representations are created to pictorially diagram component interactions. The graphical representations of the component interactions provide a pictorial diagram of component interactions for one or more components comprising the analyzed system. The graphical representations provide the FMEA analyst with a robust visual means to determine potential failure modes within the analyzed system. The sequential order of providing the graphical representations insures the graphical representation are created according to a predefined sequence of steps.

The graphical user interface 66 includes a process indicator 68 to indicate completion of each graphical representation in the sequential order. The process indicator 68 includes one or more next step descriptions 70. The next step descriptions 70 indicate which step is to be performed next according to the sequential order of steps.

The process indicator 68 begins with a step 72. Step 72 relates to preparing a boundary diagram 74. FIG. 4 illustrates the boundary diagram 74. The boundary diagram 74 provides a pictorial diagram of component interactions comprising the components in the analyzed system which, as shown in FIG. 4, is an automatic transmission shift quality system 76. The boundary diagram 74 sets the scope of the FMEA by identifying the relevant components which affect the system 72.

The relevant components are those components having a physical or a non-physical interaction with the system. A physical interaction comprises actual touching, contacting, or of joining between components. A non-physical interaction comprises energy, material, information flow, or other such interaction between components.

In the automatic transmission shift quality system 76, the relevant components comprise a suspension component 84, a body component 86, a frame & mount component 88, a driveline system component 92, a transmission component 94, an engine component 96, an exhaust system component 98, a powertrain control component 100, a throttle/speed control component 102, and a powertrain mounts component 104.

An interaction line 106 connects interacting components. The interaction line 106 comprises an arrow at both ends of the interaction line (double-arrow) if the interaction is a physical interaction, and the interaction line comprises only an arrow at one end of the interaction line (single arrow) if the interactions is a non-physical interaction.

In the case of non-physical interactions, a textual description details the non-physical interaction. For example, an interaction takes place between the engine component and the exhaust system component. A physical interaction 108 is shown with a double-arrow and a non-physical interaction 110 is shown with a single arrow. A description 112 for the non-physical interaction is shown. The direction of the single arrow of the non-physical interaction indicates the engine component delivers the non-physical interaction to the receiving exhaust gas system component, i.e., the single arrow points in the direction of the receiving component.

To determine the components and the interaction of the components shown in FIG. 4, the FMEA analyst would brainstorm to determine the various components comprising the analyzed system. Additional team members can also be included to assist the FMEA analyst. The network computer and the user computers 12 provide remote access such that multiple persons can be involved with the FMEA from different locations. This is achieved by each member accessing the graphical user interface 66 and uploading and retrieving information to and from the graphical user interface 66.

The boundary diagram 74 forces the FMEA analyst to think visually by requiring the FMEA analyst to provide a pictorial representation of the component interactions. This is an advantageous first step to insure the FMEA analyst identifies a scope of the FMEA and the components affecting the scope. In addition, the FMEA analyst is further forced to think visually by drawing the interaction lines between each interaction component. This addresses a common problem of including components in the system while at the same time failing the detail the interaction of the components with other components. A component should be kept out of the boundary diagram unless it interacts with another component in the system. Components which are not so matched up are easily identified because no interaction line connect the component to another component. Still further, the textual descriptions for the non-physical interactions provides addition visual support for understanding the interactions.

The process indicator 68 tracks completion of each step by tracking receipt of the corresponding graphical representations. Preferably, the tracking can be done by clicking on a box 118 provided next to each step. The graphical description changes as each step is completed. Initially, the graphical description states the following: "1) Still to do: prepare boundary diagram" and "2) Next to do: prepare interface matrix diagram." This means the process indicator has not registered receipt of the boundary diagram. Once the boundary diagram is received, the graphical description will change and state: "1) Still to do: prepare interface matrix diagram" and "2) Next to do: prepare parameter diagram."

In this manner, the process indicator indicates what is done, what is being worked on, and what is to be done next. Even a first-time FMEA analyst can follow the steps to generate the FMEA form. Preferably, the process indicator 68 conducts a brief computerized check of the boundary diagram 74 to make sure each component includes at least one interaction line, but such enhanced functionality is not required.

A step 120 begins after the process indicator 68 indicates receipt of the boundary diagram 74. Step 120 relates to preparing an interface matrix diagram 122. FIG. 5 illustrates the interface matrix diagram 122. The interface matrix diagram 122 provides a strength for each interaction provided by the boundary diagram 74. In this manner, the interface matrix diagram 122 builds upon the data included in the boundary diagram 74.

The interface matrix diagram 122 includes a vertical axis 124 with each component listed and a horizontal axis 126 with each component listed. Boxes 126 are place at each interaction of the vertical axis 122 and the horizontal axis 124. The boxes 126 are four quadrant boxes as indicated with the phantom lines. A numerical entry 128 is made in each box to indicate the interaction between the components connecting to the box. The strength of each interaction is a function of the numeric entry 128 and is positioned within the box 126.

A legend 129 indicates a meaning for the numerical entry within each box. A value of "2" indicates the interaction as one of necessary to functionality, a value of "1" indicates the interaction as one of beneficial but not absolutely necessary for functionality, a value of "0" indicates the interaction as one of not necessary to functionality, a value of "−1" indicates the interaction as one of causing negative effects but not preventing functionality, and a value of "−2" indicates the interaction as one of requiring prevention to achieve functionality.

The legend 129 also indicates a meaning for the positioning of the value 128 within the box. The positioning of a numerical entry in a first quadrant (P) indicates physical touching, a second quadrant (E) indicates energy transfer, a third quadrant (I) indicates information exchange, and a fourth quadrant (M) indicates material exchange. The positioning of the numerical entry provides a common description of a type of interaction. This is advantageous to generalize the various interactions provided by the boundary diagram, as there can be numerous non-physical interactions with different descriptions, as shown in FIG. 4. Preferably, more than one numerical entry can be include within each box with a total of up to four entries.

For example, the interaction between the engine component and the exhaust component includes a numerical entry for each interaction shown in the boundary diagram for these components. As such, two numerical entries are required. A first entry comprises a numeral "2" and the first quadrant to indicate a strength of interaction as physically touching and necessary to functionality. A second entry comprises a numeral "2" and the fourth quadrant to indicate a strength of interaction as material exchange and necessary to functionality.

The interface matrix diagram 122 advantageously builds upon the boundary diagram 74 by forcing the FMEA analyst to evaluate the strength of each interaction provided by the boundary diagram 74. This provides a second check of the interactions determined by the boundary diagram 74. Moreover, the visual representation of the strength value provides for quick analysis on a global level so that the FMEA analyst and team member can brainstorm potential failure modes.

A step 130 begins after the process indicator 68 indicates receipt of the interface matrix diagram 122. Step 128 relates to preparing a parameter diagram 131. FIG. 6 illustrates the parameter diagram 131. The parameter diagram 131 provides textual descriptions of noise factors 132, inputs 134, control factors 136, and outputs 138 to indicate influences of potential failure for the system. The FMEA analyst enters data for each field based in part upon reviewing the interactions provided by the boundary diagram 74 and the strength of the interaction provided by the interface matrix diagram 122. In this manner, the parameter diagram 130 builds upon the data included in the boundary diagram 74 and the interface matrix.

As such, the parameter diagram 130 ties together information provided by the boundary diagram 74 and the interface matrix diagram 122 into a format that FMEA analyst can use to generate the FMEA form.

The input 134 relates to desired aspects of the system 76 to be analyzed by the FMEA. As shown, the input 134 here relates to a request for change in vehicle performance. This means that the job of the FMEA analyst is to predict the potential failures in the system in response to such an input. To do this, the boundary diagram 74 and the interface matrix diagram 122 provide a framework that the FMEA analyst can use to create the parameter diagram 130. Other inputs can also be analyzed.

The output 138 comprises ideal functions 140 and error states 142. Unlike the inputs 134, the outputs 138 are predefined fields the FMEA analyst must fill in to complete the parameter diagram. The ideal functions 140 relate to desired output of the system if all component interactions functioned as expected. The error states 142 relate to potential errors in the output of the system. The error states 142 are determined by brainstorming potential causes of failure based on the boundary diagram 74, the interface matrix 122, the noise factors 132, and control factors 136.

The noise factors 132 indicate influences on the input 134 that can lead to disruption of the ideal function 140 and result in the error states 142. The parameter diagram 130 includes predefined noise factors for piece-to-piece variation 146, external conditions of usage 148, internal conditions of usage 150 and changes in dimension 152. These noise factors 132 are factors the FMEA analyst must analyze to indicate influences of potential failure for the system. Additional noise factors, however, can be included.

The control factors 136 relate to various preventive actions, quality checks, and testing procedures done to the components. The control factors 136 are intended to prevent the noise factors 132 from producing the error states 142 or to discover error states 142 prior to delivery. The control factors can be quality testing procedures, design parameters, and other measures.

The visual representation of the parameter diagram 131 tying together each of the noise factors 132, inputs 134, control factors 136, ideal functions 140, and error states 142 presents the FMEA analysis with a pictorial diagram of many of the features which can potential cause failures. The parameter diagram 131 leverages off of the data provided by the boundary diagram 74 and the interface matrix diagram 122. The completion of the boundary diagram 74 and the interface matrix diagram 122 prior to completing the parameter diagram 131 ensures each component interaction is characterized and the strengths of the interactions are identified and included when determining the error states.

Additional fields can be included with the parameter diagram 131. The additional fields can provide other areas to inquire into to determine other potential failure modes. For example, a knowledge base or a customer feedback base could be generated and a corresponding field entered into the parameter diagram. The FMEA analyst would then enter a corresponding control factor, error state, ideal function, or noise factor for the additional fields. Preferably, the presentation of the additional data will lead to discovery of other potential failure modes.

A step 154 begins after the process indicator 68 indicates receipt of the parameter diagram. Step 154 relates to inputting data into the various field entries of the FMEA form 26. FIGS. 7A and 7B illustrate a completed FMEA form 156 after inputting the entries. The FMEA form 156 is created by each of entering the item/function textual entry based upon reviewing the boundary diagram and the parameter diagram, entering the potential effects of failure textual entry based upon reviewing the parameter diagram, entering the potential cause of failure textual entry based on reviewing interface matrix diagram and the parameter diagram, entering the current design controls prevention based on reviewing the parameter diagram, entering the current design controls detection textual entry based on reviewing the parameter diagram, and entering the recommended action textual entry base on reviewing the parameter diagram.

A step 162 begins after the process indicator indicates receipt of the completed FMEA form 152. Step 162 relates to generating an interface checklist diagram 164. FIGS. 8A and 8B illustrate the interface checklist diagram 168. The interface checklist diagram 164 is used to check the entries made to the FMEA form. A checkmark 172 is used to indicate that a relationship has been checked. The checkmark 172 can include X's, numbers, letters, or other indicia.

The interface checklist diagram 168 includes a number of fields. Data for the fields can be manually entered or the graphical user interface 66 can import entries from one or more of the boundary diagram 74, the interface matrix diagram 122, and the parameter diagram 131. Preferably, the graphical user interface 66 automatically imports data as needed or provides fields for each noise factor 132, each error state 142, each ideal function 140, and each control factor 136 from the parameter diagram.

Noise factor management fields 174 are provided to indicate how the FMEA analyst plans to management the noise factors. As the noise factors influence failures and the generation of the error states, it is advantageous to assign a noise factor management strategy to each noise factor. The assigned strategies are checked against the FMEA form to insure the FMEA form includes similar management. The FMEA form is revised if it lacks the management strategy.

The noise factor management strategies are designated with a roman numeral checkmark. I indicates change technology required to manage the noise factor. II indicates a need to apply a parameter design control to manage the noise factor. III indicate a need to upgrade a design specification to manage the noise factor. IV indicates a need to reduce or remove noise from to manage the noise factor. V indicates a need to add a compensation device to manage the noise factor. VI indicates a need to disguise or divert to manage the noise factor.

For ideal functions 140, ideal function fields are provide to check which noise factors are affecting the ideal functions. The effect of the noise factors on the ideal functions is important as the ideal functions are the desirable output of the system. As such, the noise factors influencing the ideal functions need to be associated with the affected ideal functions and checked against the FMEA form to insure the FMEA form addresses the problem. The FMEA form is revised if it fails to take into account a noise factor which affects one of the ideal functions.

For the control factors 132, control factor fields are provided to check which controls factors are applicable to each noise factor. A checkmark matches the control factor with the corresponding noise factor. Each noise factor should receive a checkmark if a control factor is assigned to the noise factor. The FMEA form is matched against the control factor checkmarks to insure each noise factor is addressed. The FMEA form is revised if it fails to address each noise factor with one or more control factors.

While the best mode for carrying out the invention has been described in detail, those familiar with the art to which this invention relates will recognize various alternative designs and embodiments for practicing the invention as defined by the following claims. The sequential order disclosed above is not intended to limit the scope of the present invention. In contrast, a non-sequential order could be used and the use of such a non-sequential order is within the scope and contemplation of the present invention.

The invention claimed is:

1. A computer-implemented method to facilitate failure modes and effects analysis (FMEA) of one or more components of a system, wherein an FMEA form is generated to indicate the FMEA, the method comprising:

displaying with a graphical user interface used by a computer a sequential order of completion of steps for a number of graphical representations which are to be completed by an FMEA analyst and received by the graphical user interface in sequential order to facilitate generating the FMEA form;

receiving the graphical representations according to the sequential order of completion, wherein receiving the graphical representations comprises receiving a pictorial diagram of component interactions for one or more components comprising the system such that a visual display of the component interactions is received to facilitate generating the FMEA form, and wherein a first graphical representation is received and each subsequently received graphical representation is completed based in part upon the visual display provided by the first graphical representation such that each graphical representation builds upon the first graphical representation to facilitate generating the FMEA form;

wherein receiving the first graphical representation comprises receiving a boundary diagram to pictorially diagram the component interactions of the components comprising the system such that the boundary diagram facilitates generating the FMEA form, wherein the boundary diagram identifies physical and non-physical interactions between the components comprising the system;

receiving textual inputs naming each one of the components comprising the system and graphically displaying the names with an interaction of the components, wherein the interaction is graphically displayed by drawing an interaction line between each component to pictorially diagram the system interactions; and indicating the interaction line with double arrows to indicate a physical interface and a single arrow to indicate non-physical interaction, wherein each non-physical interaction includes a textual description.

2. The method of claim 1 further comprising displaying a process indicator to indicate completion of each graphical representation in the sequential order, wherein the process indicator tracks receipt of each graphical representation for use in indicating completion of the graphical representation.

3. The method of claim 1 further comprising receiving an interface matrix diagram after receiving the boundary diagram to pictorially diagram the component interactions of the components comprising the system such that the interface matrix is used in combination with the boundary diagram to facilitate generating the FMEA form, wherein the interface matrix diagram includes interface valuation data which identifies a strength for each interaction determined by the boundary diagram.

4. The method of claim 3 further comprising receiving a numerical strength input for each interaction to indicate the strength of the interaction.

5. The method of claim 4 further comprising indicating the numerical strength input with a value indicating the strength for each interaction as one of necessary to functionality, beneficial but not absolutely necessary for functionality, not necessary to functionality, causing negative effects but not preventing functionality, and requiring prevention to achieve functionality.

6. The method of claim 5 wherein the interface matrix includes a four quadrant box for each component comprising the system and arranges the components within the interface matrix such that one box is provided to match each component with every other component comprising the system, and wherein the method further comprises positioning the numerical strength input within one quadrant of the four quadrants of the four quadrant boxes to indicate a type of interaction for the component.

7. The method of claim 6 further comprising positioning the numerical strength input in a first quadrant to indicate physical touching, a second quadrant to indicate energy transfer, a third quadrant to indicate information exchange, and a fourth quadrant to indicate material exchange.

8. The method of claim 3 further comprising receiving a parameter diagram after receiving the boundary diagram and the interface matrix diagram to pictorially diagram the component interactions of the components comprising the system such that the parameter diagram is used in combination with the boundary diagram and the interface matrix to facilitate generating the FMEA form, wherein the parameter diagram includes textual descriptions of noise factors, inputs, design controls, and outputs to indicate influences of potential failure for the system based on the interactions provided by the boundary diagram and the strength for each interaction provided by the interface matrix.

9. The method of claim 8 further comprising receiving noise factors for the group comprising place-to-place variation, external conditions of usage, internal conditions of usage and changes in dimension to indicate influences of potential failure for the system.

10. The method of claim 9 further comprising receiving outputs from the group of ideal function and errors states to indicate influences of potential failure for the system.

11. The method of claim 10 wherein the FMEA form includes an item/function textual entry, a potential failure mode textual entry, a potential effects of failure textual entry, a potential cause of failure textual entry, a current designs controls prevention textual entry, a current design controls detection textual entry, and a recommended action textual entry, and the method further comprises generating the FMEA form by each of entering the item/function textual entry based upon reviewing the boundary diagram and the parameter diagram, entering the potential effects of failure textual entry based upon reviewing the parameter diagram, entering the potential cause of failure textual entry based on reviewing interface matrix diagram and the parameter diagram, entering the current design controls prevention based on reviewing the parameter diagram, entering the current design controls detection textual entry based on reviewing the parameter diagram, and entering the recommended action textual entry base on reviewing the parameter diagram.

12. The method of claim 11 further comprising revising the generated FMEA form based on receiving an interface checklist diagram, wherein the interface checklist diagram includes noise factors from the parameter diagram and requires a number of checkmarks for each noise factor in one or more categories from the group comprising the error states provided by the parameter diagram, noise factor management strategies, the ideal functions provided by the parameter diagram, and design controls provided by the parameter diagram such that the FMEA form is revised for each noise factor which fails to include one or more checkmarks.

13. A computer-implemented method to generate a failure modes and effects analysis (FMEA) form for one or more components of a system, the method comprising:

providing a graphical user interface for use with a computer, wherein the graphical user interface provides a number of data entry fields for an item/function textual entry, a potential failure mode textual entry, a potential effects of failure textual entry, a severity numerical entry, a classification textual entry, a potential cause of failure textual entry, a frequency of occurrence numerical entry, a current designs controls prevention textual entry, a current design controls detection textual entry, a detection numerical entry, a risk prioritization numerical entry, a recommended action textual entry, a responsibility textual entry, an actions taken textual entry, a revised severity numerical entry, a revised frequency of occurrence numerical entry, a revised detection numerical entry, and a revised risk prioritization numerical entry to be inputted with data for generating the FMEA form;

displaying with the graphical user interface a sequential order of completion of steps for a number of graphical representations which are to be completed by an FMEA analyst and received by the graphical user interface in sequential order to facilitate generating the FMEA form;

receiving the graphical representations according to the sequential order of completion, wherein receiving the graphical representations comprises receiving a pictorial diagram of component interactions for one or more components comprising the system such that a visual display of the component interactions is received to facilitate generating the FMEA form, and wherein a first graphical representation is received and each subsequently received graphical representation is completed based in part upon the visual display provided by the first graphical representation such that each graphical representation builds upon the first graphical representation to facilitate generating the FMEA form; and inputting data into each of the entries provided by the graphical user interface after receiving the graphical representation according to the sequential order of completion.

14. A computer-implemented method to facilitate failure modes and effects analysis (FMEA) of one or more components of a system, wherein an FMEA form is generated to indicate the FMEA, the method comprising:

displaying with a graphical user interface used by a computer a sequential order of completion of steps which are to be completed by an FMEA analyst in sequential order to facilitate generating the FMEA form;

completing the steps in sequential order;

generating the FMEA form upon completion of a last step; and wherein the sequential order of completion of steps comprises in order providing a boundary diagram graphical representation, providing an interface matrix diagram graphical representation, and providing a parameter diagram graphical representation, wherein providing the graphical representations comprises providing a pictorial diagram of component interactions for one or more components comprising the system such that a visual display of the component interactions is provided to facilitate generating the FMEA form, and wherein the boundary diagram graphical representation is provided, the interface matrix diagram graphical representation is provided after providing the boundary diagram graphical representation and based in part upon the visual display provided by the boundary diagram graphical representation, and the parameter diagram graphical representation is provided after providing the boundary diagram graphical representation and the interface matrix diagram graphical representation such that each graphical representation builds upon the boundary diagram graphical representation to facilitate generating the FMEA form.

15. A computer program stored on a computer-readable medium for executing on a computer a failure modes and effects analysis (FMEA) of one or more components of a system, wherein an FMEA form is generated to indicate the FMEA, the computer program programmed to:

display a sequential order of completion of steps for a number of graphical representations of component interactions which are to be completed by an FMEA analyst and received by the graphical user interface in sequential order to facilitate generating the FMEA form;

indicate whether the graphical representations are received according to the sequential order of completion; and to receive a boundary diagram, an interface matrix diagram, a parameter diagram, and an interface checklist diagram.

16. A computer-implemented method to facilitate failure modes and effects analysis (FMEA) of one or more components of a system, wherein an FMEA form is generated to indicate the FMEA, the method comprising:

displaying with a graphical user interface used by a computer a sequential order of completion of steps for a number of graphical representations which are to be completed by an FMEA analyst and received by the graphical user interface in sequential order to facilitate generating the FMEA form; and receiving the graphical representations according to the sequential order of completion, wherein receiving the graphical representations comprises receiving a boundary diagram of component interactions for one or more components comprising the system such that a visual display of the component interactions is received to facilitate generating the FMEA form, and wherein a first graphical representation is received and each subsequently received graphical representation is completed based in part upon the visual display provided by the first graphical representation such that each graphical representation builds upon the first graphical representation to facilitate generating the FMEA form.

* * * * *